US012650403B2

(12) United States Patent
Baron et al.

(10) Patent No.: US 12,650,403 B2
(45) Date of Patent: Jun. 9, 2026

---

(54) SENSOR AND SEAL FOR SENSOR

(71) Applicant: ALPHASENSE LIMITED, Great Notley (GB)

(72) Inventors: Ronan Baron, Braintree (GB); Lee Jones, Braintree (GB); Richard Smith, Braintree (GB); Richard Dudeney, Braintree (GB)

(73) Assignee: ALPHASENSE LIMITED, Great Notley (GB)

( * ) Notice: Subject to any disclaimer, the term of this patent is extended or adjusted under 35 U.S.C. 154(b) by 146 days.

(21) Appl. No.: 18/588,636

(22) Filed: Feb. 27, 2024

(65) Prior Publication Data

US 2024/0295525 A1    Sep. 5, 2024

(30) Foreign Application Priority Data

Mar. 3, 2023    (GB) ...................................... 2303146

(51) Int. Cl.
   *G01N 27/40*     (2006.01)
   *F16J 15/02*     (2006.01)
   (Continued)

(52) U.S. Cl.
   CPC ........... *G01N 27/40* (2013.01); *G01N 27/413* (2013.01); *F16J 15/02* (2013.01); *G01N 27/404* (2013.01)

(58) Field of Classification Search
   CPC .... G01N 27/40; G01N 27/413; G01N 27/404; G01N 27/401; F16J 15/02; F16J 9/20; F17B 1/04
   See application file for complete search history.

(56) References Cited

U.S. PATENT DOCUMENTS 2,873,132 A * 2/1959 Tanner ..................... F16J 15/32
                                 277/436
4,178,003 A * 12/1979 Hobson .................. F16J 15/328
                                 277/924

(Continued)

FOREIGN PATENT DOCUMENTS

WO         0181911 A1   11/2001

OTHER PUBLICATIONS

Allied Metrics Sales and Fasteners, Inc, X-Rings & Square Rings product description, May 23, 2022 , https://web.archive.org/web/20220523073305/https://www.alliedmetrics.com/products/o-rings/x-rings-square-rings/ (Year: 2022).*

*Primary Examiner* — Alexander S Noguerola
(74) *Attorney, Agent, or Firm* — Haukaas Fortius PLLC; Michael Haukaas; Paul K. Judd

(57) ABSTRACT

An electrochemical gas sensor comprising a housing containing a plurality of electrodes and a liquid electrolyte, the housing having a gas inlet, the sensor defining at least one port through the housing having a metal interface pin therein, the interface pin extending through the port from the exterior of the housing, being electrically connected to at least one of the plurality of electrodes in the interior of the housing, the sensor additionally comprising a seal located around the metal interface pin within the port, and compressed between a wall of the port and the metal interface pin thereby restricting egress of liquid electrolyte from the housing, wherein the seal comprises an annular seal which in its uncompressed form either presents a cross-section which is concave in a radially extending direction of the seal, or whose width is constant over an extended axial direction of the seal.

20 Claims, 8 Drawing Sheets

(51) Int. Cl.
    *G01N 27/413*        (2006.01)
    *G01N 27/404*        (2006.01)

(56)            References Cited

U.S. PATENT DOCUMENTS

| | | | | |
|---|---|---|---|---|
| 4,268,370 A | * | 5/1981 | Neti | G01N 27/404 |
| | | | | 204/415 |
| 5,954,094 A | * | 9/1999 | Base | F28D 7/12 |
| | | | | 215/319 |
| 7,282,168 B2 | | 10/2007 | Downer et al. | |

* cited by examiner

SENSOR AND SEAL FOR SENSOR

RELATED APPLICATIONS

This application claims priority under 35 U.S.C. § 119 (a) to Great Britain Application No. 2303146.1 filed on Mar. 3, 2023, which application is incorporated herein by reference.

FIELD OF THE INVENTION

The present invention relates to the field of electrochemical gas sensors and in particular to the sealing of electrochemical gas sensor housings.

BACKGROUND TO THE INVENTION

Issues relating to the invention will be described with reference to galvanic oxygen sensors, although corresponding issues can apply with other electrochemical gas sensors, such as amperometric sensors. Electrochemical gas sensors, including galvanic electrochemical gas sensors, are widely employed for the measurement of oxygen. These sensors include a housing and a plurality of electrodes comprising at least a sensing electrode (cathode). The invention relates to gas sensors with a liquid electrolyte. Accordingly, in the interior of the sensor, within the housing, three phases may be present, gas (for example the gaseous analyte), liquid (for example the liquid electrolyte) and solid (for example, the electrode and/or catalyst).

It is technically challenging to seal the housing of a gas sensor using a liquid electrolyte. The liquid electrolytes are typically aggressive materials, for example, concentrated potassium hydroxide. External electrical connections to electrodes must therefore be sealed to prevent the loss of liquid electrolyte from the sensor. Furthermore, there is a need for the housing to be gas permeable in some way to enable access by the analyte gas which is typically consumed as part of a measurement reaction. In the case of a galvanic oxygen sensor, the metal anode is oxidised resulting in the production of metal oxide.

Within a zone in the sensor housing, there is typically gas in contact with or in a reservoir which retains the liquid electrolyte within the sensor housing. Thus, in some sensors, an external electrical connection to a sensor electrode must be sealed where it passes through the housing. The seal must be liquid tight to prevent egress of significant amounts of electrolyte, however in some embodiments, gas and more importantly liquid must be able to pass between an electrolyte region of the sensor and the external atmosphere, albeit slowly or intermittently, through the seal. In the case of a galvanic oxygen sensor, the cell reaction may include oxidation of the anode. The anode may be lead, in which case oxidation results in the production of the more voluminous lead oxide. The transformation of lead to lead oxide within the sensor results in pressure build up within the sensor body. It may be advantageous if the seal permits the slow escape of minor quantities of electrolyte liquid to compensate for the increase in volume of solid material within the sensor body due to the transformation of the lead anode to lead oxide.

For at least twenty years it has been common to seal the electrical connection through the housing of an electrochemical sensor to an electrode using an O-ring. However, the seal remains a major cause of failure of electrochemical sensors. The invention seeks to provide a more reliable seal.

SUMMARY OF THE INVENTION

According to a first aspect of the invention there is provided an electrochemical gas sensor comprising a housing, the housing containing a plurality of electrodes and a liquid electrolyte, the housing having a gas inlet for receiving analyte gas, the sensor defining at least one port through the housing having a metal interface pin therein, the interface pin extending through the port from the exterior of the housing, being electrically connected to at least one of the plurality of electrodes in the interior of the housing, the sensor additionally comprising a seal located around the metal interface pin within the port, and compressed between a wall of the port and the metal interface pin thereby restricting egress of liquid electrolyte from the housing, wherein the seal comprises an annular seal which in its uncompressed form either presents a cross-section which is concave in a radially extending direction of the seal, or whose width is constant over an extended axial direction of the seal.

Radially extending direction is a direction which extends radially with respect to the annular seal. Axial direction means in an axial direction of the annular seal. Width refers to radial extent between the radially inward and radially outward surfaces of the annular seal.

The annular seal is typically compressed radially when in place in the electrochemical sensor.

An O-ring annular seal has a cross sectional profile which is circular and always convex. We have found that in a galvanic oxygen sensor, an annular seal which in its uncompressed form either presents a cross-section which is concave in a radially extending direction of the seal, or whose width is constant over an extended axial direction of the seal provides a much more reliable seal, with a longer lifetime, than an O-ring. An annular seal which in its uncompressed form presents a radially outwardly open groove and a radially inwardly open groove, whereby the radially outwardly open groove is not convex and the radially inwardly open groove is not convex, provides a much more reliable seal, with a longer lifetime, than an O-ring. As well as offering a high level of reliability, such a seal is particularly suited to a galvanic oxygen sensor and use of such a seal may result in reduced sensor failure. In use, the annular seal is compressed in the space between the wall of the port and the metal interface pin. It may be that the annular seal forms two sealing lines around the pin, one at each side of the groove. It may be that the annular seal forms a sealing line of extended depth if compressed sufficiently for the groove to be suppressed in the assembled sensor. This contrasts with an O-ring which has a single sealing line at each contact surface. It may be that the annual seal is less susceptible to rolling during assembly of the sensor. In one geometrical extreme, the radially outwardly open groove may be a flat surface with an infinitesimally small groove depth. Similarly, the radially inwardly open groove may be a flat surface with an infinitesimally small groove depth. Where each of the radially outward side and the radially inward side of the annular ring have an infinitesimally small groove depth, the annular ring may present a rectangular or a square cross-section.

Nevertheless, we have found that although the resulting seal is gas tight when the gas pressure is balanced between the interior of the housing and the atmosphere around the sensor, when the gas pressure within the housing exceeds the atmospheric gas pressure adjacent the sensor by a margin, gas may pass by the annular seal and the metal interface pin and thereby be released from the interior of the housing. This is important to prevent excessive gas build up. The seal restricts, and may possibly prevent, loss of liquid electrolyte from the interior of the housing to the exterior. Gas pressure may build up within the sensor due to oxidation of an electrode, typically an anode, within the sensor. If the anode is a lead anode, which may be the case for an oxygen sensor, then oxidation of the lead anode to lead oxide results in an increase in the volume of solid material within the sensor due to lead oxide being more voluminous than lead.

It may be that the seal functions as a valve, allowing the controlled egress of fluid/liquid when a sufficient pressure builds up within the interior of the sensor. It may be that pressure builds up within the interior of the sensor due to oxidation of the anode within the sensor. As a result of the sensor functioning to sense gas, the anode may oxidise leading to an increase in the physical volume of the anode, which thereby takes up more of the internal space of the sensor. It may be that in use the sealing line that is in closest communication with the interior of the sensor is penetrated first by gas as pressure within the sensor increases. Then the second sealing line, in closest communication with the exterior, is penetrated by liquid, but as liquid egresses past the second sealing line, the first sealing line again becomes liquid tight. In this way controlled egress of liquid with minimum loss of electrolyte may be enabled.

The metal interface pin typically comprises a first connection end and a second connection end. Between the first connection end and the second connection end is typically a circumferential ridge. The circumferential ridge typically separates the first connection end of the metal interface pin from the second connection end. Each of the first connection end, the second connection end, and the circumferential ridge is typically of generally cylindrical form. The free ends of the first connection end and the second connection end may be truncated cones.

The housing may comprise a portion which is indented, so forming a cavity, at the base of which there is a break in the housing wall. In the assembled electrochemical sensor, the metal interface pin typically sits within this cavity, the second connection end extending outwards, and the first connection end extending into the interior of the housing. The circumferential ridge preferably sits within the cavity when the sensor is assembled. In the assembled sensor the annular seal is typically in a position between the circumferential ridge and the cavity, being the base of the indented portion of the housing. The second connection end of the metal interface pin extends from the cavity away from the main sensor body.

Although the term annular seal is used, it is apparent to the person skilled in the art that an annular seal is a three-dimensional object and not a two-dimensional annulus. An O-ring seal for example is understood to be an annular seal, although it has the shape of a torus.

An annular seal has a central passage. For an annular seal which in its uncompressed form presents a radially outwardly open groove and a radially inwardly open groove, each groove of the annular seal is typically a closed-loop groove around the annular seal. Typically, in the (uncompressed) annular seal the radially outwardly open groove and the radially inwardly open groove are directly opposite one another. In this way the radially outwardly open groove and the radially inwardly open groove define, in-between the two grooves, a neck region of the annular seal. The annular seal in its uncompressed form is typically uniform in its material composition. The annular seal in its uncompressed form typically possesses a uniform compressibility. The annular seal may be manufactured through a moulding procedure. An annular seal is typically manufactured through a moulding procedure as an individual element in its own right.

The annular seal may comprise a parting line within a groove, for example a closed-loop parting line. A parting line is typically formed in a body manufactured by a moulding procedure. The annular seal may comprise further closed-loop grooves. Each of the further closed-loop grooves may be outwardly open in an axial direction of the annular seal. Typically for each closed-loop groove of the annular seal, the annular seal has another closed loop groove directly opposite. Each pair of oppositely situated closed-loop grooves forms a neck region. The annular seal may comprise a plurality of neck regions. Each groove may be bordered by a lobe. Each groove may be bordered by a closed-loop lobe. Each groove may be bordered by two closed-loop lobes. The annular seal may, for example, be an X-ring seal. An X-ring seal has four closed loop grooves. An X-ring seal has four lobes. Each of the lobes extends around the annular seal. Around the seal, between neighbouring lobes a groove is present in the material of the seal. Of the four grooves of an X-ring, a first groove and a second groove each open away from the annular ring in the plane of the ring, and a third groove and a fourth groove each open perpendicular to the plane of the ring. The first groove opens radially outward of the seal. The second groove opens radially inwardly of the seal, towards the annular centre of the seal. The first groove opens radially outward at the same level of the annular seal that the second groove opens radially inward. The first groove and the second groove form a first neck region between them. The third and fourth grooves each open in a direction perpendicular to the plane of the ring, and each in a direction opposite to the other. The third groove and the fourth groove are positioned opposite each other in the annular seal. The third groove and the fourth groove form a second neck region between them. The orientation of the first neck region is at right angles to the second neck region. An X-ring seal is typically used as a seal between two surfaces which move relative to one another, in which dynamic environment the grooves in an X-ring seal serve to store and distribute lubricant.

In order to perform its sealing function, an annular seal must be compressed. An annular seal may be compressed axially, it may be compressed radially, or it may be compressed both axially and radially. Typically, when in place in the electrochemical sensor the annular seal is compressed radially. When the annular seal is positioned in the assembled electrochemical sensor the first connection end of the metal interface pin passes through the central passage of the annular seal. The radius of the first connection end of the metal interface pin exceeds and is typically slightly larger than the radius of the central passage of the relaxed annular seal. In this way, when the first connection end of the metal interface pin is positioned within the central passage of the relaxed annular seal, the annular seal is compressed outwards by the presence of the metal interface pin. Similarly, the cavity may have an internal diameter which is smaller than the external diameter of the annular seal. Thus, when the annular seal is positioned in the assembled electrochemical sensor, it will be compressed inwards by the surrounding wall of the cavity. In a preferred embodiment the radius of the first connection end of the metal interface pin is slightly larger than the central passage of the relaxed annular seal and the cavity has an internal diameter which is smaller than the external diameter of the annular seal. In this way, the annular seal will be subject to radial compression.

The annular seal may also be subject to axial compression. Although this is less preferred in the present disclosure, axial compression of the annular seal may be provided by the circumferential ridge of the metal interface pin on one side of the annular ring, and by the base of the indented portion of the housing on the other side.

An X-ring seal is most usually employed in applications where there is intended to be movement, either rotational or reciprocating. The sensor of the present disclosure is a static unit. In particular, a metal interface pin once in place in the assembled sensor should not move.

An O-ring seal has a circular cross-section and one point of contact when placed against a surface to seal. An X-ring seal in contrast presents a double seal to a surface, as two lobes associated with a closed loop groove contact the surface. This difference in the seals means that the sealing properties of an X-ring seal are different to those of an O-ring. Further differences, albeit related ones, exist when an O-ring seals against a sealing surface compared to when an X-ring seals against a sealing surface. For example, the maximum compression experienced in an O-ring when sealed against a surface is at the midpoint of the contact. The compression decreases towards the edges of the contact area. In contrast, when an X-ring is sealed against a surface, the maximum compression experienced by the X-ring is where the lobes at either side of the groove first contact the surface. This has the result that a closed loop of lesser compression is formed in the X-ring, bordered by two closed loops of greater compression. This difference may contribute to improved sealing properties in the presently disclosed sensor.

The difference in the cross-sectional geometry of an O-ring compared to an X-ring (or indeed an annular ring seal which in its uncompressed form presents an open groove to the sealing surface) may result in a difference in contact angle between the sealing surface and the compressed ring. The contact angle between a compressed O-ring and a sealing surface may be more acute, whereas the contact angle between a compressed X-ring (or indeed an annular ring seal which in its uncompressed form presents an open groove to the sealing surface) and a sealing surface is less acute, tending towards a right angle. This may reduce fluid forces penetrating the seal when gas pressure builds up within the sensor. This difference may contribute to improved sealing properties in the presently disclosed sensor.

Depending on circumstances and depending on the sensor design, potting may also be present and contribute to the seal. Potting may be provided by epoxy resin inserted into the space in the indented region of the housing which remains following insertion of the sealing ring and the interface pin, for example.

The housing may comprise a reservoir for retaining liquid electrolyte. The housing may constitute a reservoir for electrolyte. Alternatively, a wick or an electrolyte diffusion support, such as a hydrophilic glass wool, may be provided to conduct liquid electrolyte from the reservoir to the electrodes. The housing may comprise an electrode stack comprising a plurality of planar electrodes formed on layers of liquid permeable electrode supports, whereby a liquid conduction path extends from the electrode support of each planar electrode to the reservoir.

Within the housing, the sensor may comprise a sensing gas space in gaseous communication with the gas inlet and a sensing electrode for the introduction of gas to the sensing electrode. The gas inlet may comprise a diffusion limiting member such as a capillary, or a diffusion membrane. The sensor may comprise a reservoir gas space, separate to the sensing gas space, in contact with the reservoir and in gaseous communication with the port.

The sensor typically takes the form of a battery or of an electrochemical cell. An analyte gas to be detected is typically oxidised or reduced at the sensing electrode. In electrochemical balance to the reaction of the sensing electrode, one or more gaseous species may be generated at one or more electrodes which are in gaseous communication with the reservoir gas space, for example at a counter electrode and/or reference electrode. Accordingly, gas may be generated within the sensor during operation. This gas must be released from the housing in some way, for example through the seal. An increase in gas pressure within the reservoir gas space, due to gas generation or increased temperature, may cause excess gas to be forced around the seal and thereby be vented. In the case of a galvanic sensor the cathode may also be oxidised as a result of sensor operation. The production of solid oxide within the sensor due to this oxidation may result in the solid mass within the sensor increasing in volume, leading to the build up of pressure within the sensor.

The port which is defined by the housing may be present in an indented region of the housing wall. The indented region of the housing wall is typically sized to accommodate a metal interface pin and a corresponding seal, such as an X-seal.

The metal interface pin typically utilised in a sensor according to the present disclosure may take the form of a single conducting element with a first connection end and a second connection end. The metal interface pin may also comprise a circumferential ridge which is present between the first connection end and the second connection end.

The annular seal is placed around the first connection end of the metal interface pin, which is inserted into the indented region of the housing wall. In this way the seal may be retained between the circumferential ridge of the metal interface pin and the bottom of the indented region of the housing. In order to provide the sealing effect, the seal typically requires compression. Compression of the seal may be provided by the side wall of the metal interface pin, typically cylindrical, and the inner side wall of the indented region, also typically cylindrical. In this way, the annular seal may be radially compressed between the inner side wall of the indented region and the outer side wall of the metal interface pin. The dimensions of the annular seal, the cavity of the housing and the metal interface pin are typically selected to provide radial compression.

According to a further aspect of the invention there is provided a method of assembling an electrochemical gas sensor (such as an electrochemical sensor according to the first aspect of the invention), the method comprising inserting an annular seal into an indented region of a housing wall leading to a port through the sensor housing, and inserting a first connection end of a metal interface pin through the annular seal, the annular seal being thereby radially compressed between the indented region of the housing wall and the first connection end of the interface pin to seal the port from the external atmosphere, wherein the annular seal in its uncompressed form presents a radially outwardly open groove and a radially inwardly open groove.

Although the term annular seal is used, it is apparent to the person skilled in the art that an annular seal is a three-dimensional object and not a two-dimensional annulus. An O-ring seal for example is understood to be an annular seal, although it has the shape of a torus.

An annular seal has a central passage. Each groove of the annular seal is typically a closed-loop groove around the annular seal. Typically, in the (uncompressed) annular seal the radially outwardly open groove and the radially inwardly open groove are directly opposite one another. In this way the radially outwardly open groove and the radially inwardly open groove define, in-between the two grooves, a neck region of the annular seal. The annular seal in its uncompressed form is typically uniform in its material composition. The annular seal in its uncompressed form typically possesses a uniform compressibility. The annular seal may be manufactured through a moulding procedure. The annular seal may comprise a parting line within a groove, for example a closed-loop parting line. A parting line is typically formed in a body manufactured by a moulding procedure.

The annular seal may comprise further closed-loop grooves. Each of the further closed-loop grooves may be outwardly open in an axial direction of the annular seal. Typically for each closed-loop groove of the annular seal, the annular seal has another closed loop groove directly opposite. Each pair of oppositely situated closed-loop grooves forms a neck region. The annular seal may comprise a plurality of neck regions. Each groove may be bordered by a lobe. Each groove may be bordered by a closed-loop lobe. Each groove may be bordered by two closed-loop lobes. The annular seal may, for example, be an X-ring seal. An X-ring seal has four lobes. Each of the lobes extends around the annular seal. Around the seal, between neighbouring lobes a groove is present in the material of the seal. Of the four grooves of an X-ring, a first groove and a second groove each open away from the annular ring in the plane of the ring, and a third groove and a fourth groove each open perpendicular to the plane of the ring. The first groove opens radially outward of the seal. The second groove opens radially inwardly of the seal, towards the annular centre of the seal. The first groove opens radially outward at the same level of the annular seal that the second groove opens radially inward. The first groove and the second groove form a first neck region between them. The third and fourth grooves each open in a direction perpendicular to the plane of the ring, and each in a direction opposite to the other. The third groove and the fourth groove are positioned opposite each other in the annular seal. The third groove and the fourth groove form a second neck region between them. The orientation of the first neck region is at right angles to the second neck region. An X-ring seal is typically used as a seal between two surfaces which move relative to one another, in which dynamic environment the grooves in an X-ring seal serve to store and distribute lubricant.

The annular seal may be inserted into the indented region of the housing wall in such a way to avoid rolling and to avoid the creation of torsion within the annual seal. In this way the radially outwardly open groove and the radially inwardly open groove each retains its orientation when the annular seal is present in the assembled electrochemical gas sensor.

If an X-ring seal is utilised, the X-ring seal may be inserted into the indented region of the housing wall in an orientation, firstly, of the first groove opening radially outward of the seal, whereby the lobes neighbouring the first groove approach substantially equally the indented region of the housing wall, and, secondly, of the second groove opening radially inwardly of the seal, whereby the lobes neighbouring the second groove approach substantially equally the outer surface of the first connection end of the metal interface pin.

The cross-section of the annular seal in its uncompressed form may present parallel sides which extend in the axial direction.

The cross-section of the annular seal in its uncompressed form may present parallel sides which extend in the axial direction over at least 25% of the dimension of the annular seal in the axial direction, or preferably may present parallel sides which extend in the axial direction over at least 50% of the dimension of the annular seal in the axial direction. The parallel sides may have constant internal and external radius. The parallel sides are typically perpendicular to the radial direction of the annular seal. An annular seal with extended parallel sides is expected to provide sealing properties which lead to a sensor failure rate which is less than that which occurs when an O-ring is used to create a seal between the metal interface pin and the sensor housing.

The sensor may, for example, be a sensor for ammonia, carbon dioxide, carbon monoxide, hydrogen sulphide, chlorine, ethylene oxide, hydrogen, hydrogen chloride, nitric oxide, nitrogen dioxide, NOx, combustible gases or volatile organic compounds (VOCs). The sensor may be a sensor for oxygen.

The liquid electrolyte may comprise an acid. The liquid electrolyte may comprise sulphuric acid. The liquid electrolyte may comprise an acid at a concentration of at least 5M. The liquid electrolyte may sulphuric acid at a concentration of at least 5M. The liquid electrolyte may comprise an alkali, for example sodium hydroxide, potassium hydroxide or potassium acetate.

The annular seal may be formed from nitrile or nitrile rubber. Alternatively, the annular seal may be formed from other materials, such as ethylene propylene diene monomer (EPDM) synthetic rubber.

DESCRIPTION OF THE DRAWINGS

An example embodiment of the present invention will now be illustrated with reference to the following Figures in which.

DETAILED DESCRIPTION OF AN EXAMPLE EMBODIMENT

Figure 1:
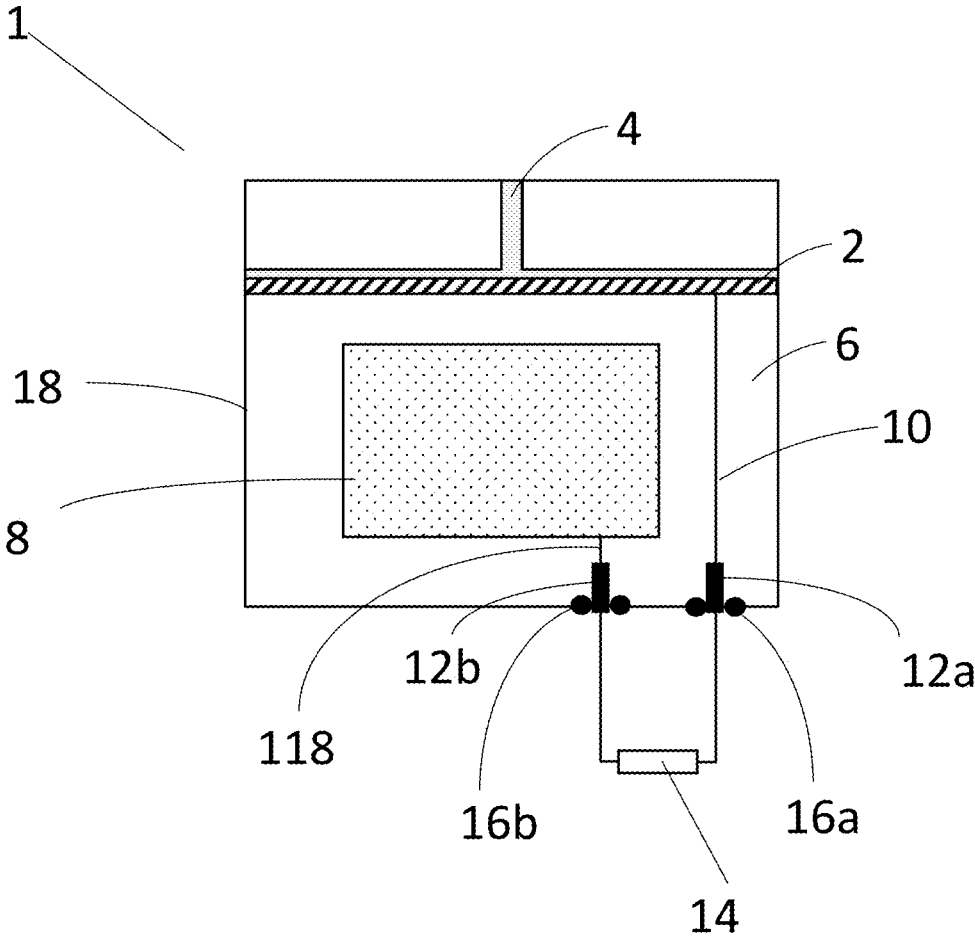
FIG. 1 shows a galvanic oxygen gas sensor known in the art.

A known galvanic oxygen sensor 1 is illustrated in cross-section in FIG. 1. In this known sensor, the flow of gas from the ambient atmosphere to the carbon/platinum cathode 2 is controlled by capillary 4. Oxygen arriving at the cathode 2 is reduced, resulting in the accumulation of hydroxyl ions in the electrolyte 6. The balancing oxidation reaction occurs at the anode 8. The anode of a galvanic oxygen sensor is typically made of lead (Pb), and oxidation of the anode results in the production of lead oxide. The interior of the sensor acts as a reservoir for the electrolyte 6, which is typically potassium hydroxide. The reduction of oxygen at the sensing cathode 2 produces a current which passes, via cathode lead wire 10 and metal interface pin 12*a*, to the exterior of the sensor. The current then passes through load resistor 14 and re-enters the sensor at metal interface pin 12*b* where it returns to the anode 8. The current passing through the load resistor 14 reflects the reduction of oxygen at the sensing cathode and provides the sensor signal. Metal interface pins 12*a* and 12*b*, shown only schematically in FIG. 1, each traverse the sensor housing from the exterior to the electrolyte reservoir in the interior of the sensor. In order to prevent the escape of electrolyte from the reservoir of the sensor an O-ring seal 16*a*, 16*b* surrounds each metal interface pin 12*a*, 12*b*.

As oxygen is detected by a galvanic sensor, the anode is converted from lead to lead oxide. The ultimate lifetime of the sensor is determined by the quantity of non-oxidized lead remaining in the anode. To maximise the sensor lifetime the quantity of lead making up the anode is made as large as is possible within the confines of the device. Lead oxide is less dense than lead and has a higher molar mass. This has the consequence that as anode lead is converted to lead oxide, the volume of solid material within the sensor increases. The increase in volume of solid material within the sensor body results in an increase of pressure within the sensor and can also result in the anode body pushing against interior surfaces of the sensor. This can result in rupture of the sensor body, effectively bringing its usefulness to a premature end.

Figure 2:
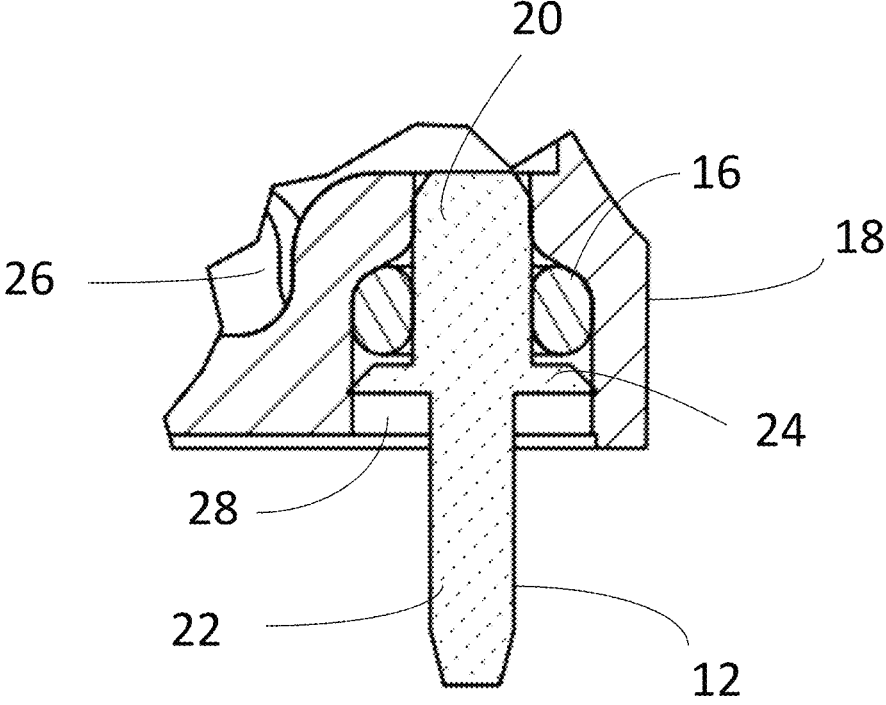
FIG. 2 shows a cross-sectional diagram of a metal interface pin positioned in the housing of an electrochemical gas sensor, with a conventional O-ring seal sealing the interior of the housing.

FIG. 2 shows in cross-section a limited region of the housing 18 of an electrochemical sensor known in the art including metal interface pin 12. The metal interface pin 12 comprises a first connection end 20 and a second connection end 22, with a circumferential ridge 24 in-between. The pin 12 traverses the wall of the housing through a port, whereby the first connection end extends into the interior 26 of the housing 18. O-ring 16 sits within cavity 28, being an indented region of the housing 18. Within the indented region 28, O-ring 16 is enclosed by the end wall of the region and the circumferential ridge 24 which separates into first 20 and second 22 connection ends of the interface pin 12. The O-ring 16 is compressed annularly between the outer wall of the first connection end 20 and the surrounding wall of the indented region 28, resulting in the formation of a seal between the interior of the housing 26 and the external atmosphere. Ideally, this seal serves to retain liquid electrolyte within the sensor. The seal also serves to enable gas which might build up within the sensor due to its operation to escape.

Figure 3:
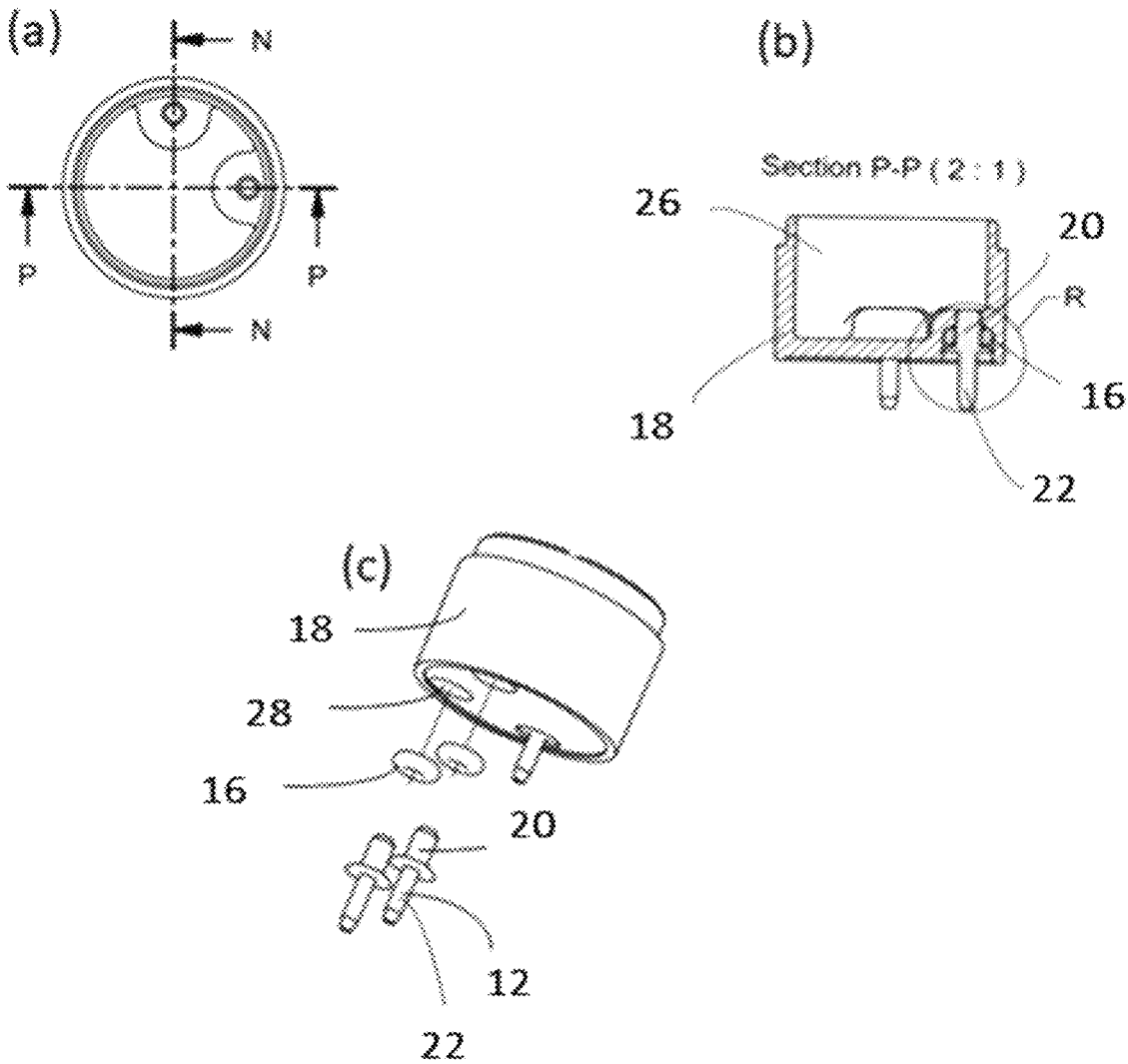
FIG. 3(a) shows the positions of two external pins in the base of an electrochemical gas sensor; (b) shows a cross-sectional view of the plane P-P through the second of the external pins; (e) illustrates how the metal interface pins and the annular seals are assembled in the sensor. A conventional O-ring seal is depicted in these figures.

Further illustrations of the housing and the metal interface pin of an electrochemical gas sensor are shown in FIG. 3. FIGS. 3(*a*) and 3(*b*) show respectively a planar view of the base of the sensor and a cross-sectional view and illustrate the positioning of two metal interface pins in the sensor.

FIG. 3(*c*) illustrates an expanded assembly of this part of the electrochemical sensor. An annular sealing ring 16 is inserted into an indented portion 28 of the housing 18 leading to a port providing communication between the interior and the exterior of the sensor housing. Oil may be applied to the external surface of the annular sealing ring 16 prior to insertion. A metal interface pin 12 is inserted into the same port. The dimensions of the indented portion 28, the sealing ring 16 and metal interface pin 12 are such that the sealing ring 16 is compressed annularly between the indented portion 28 of the housing and the interface pin 12 thereby forming a seal.

Figure 4:
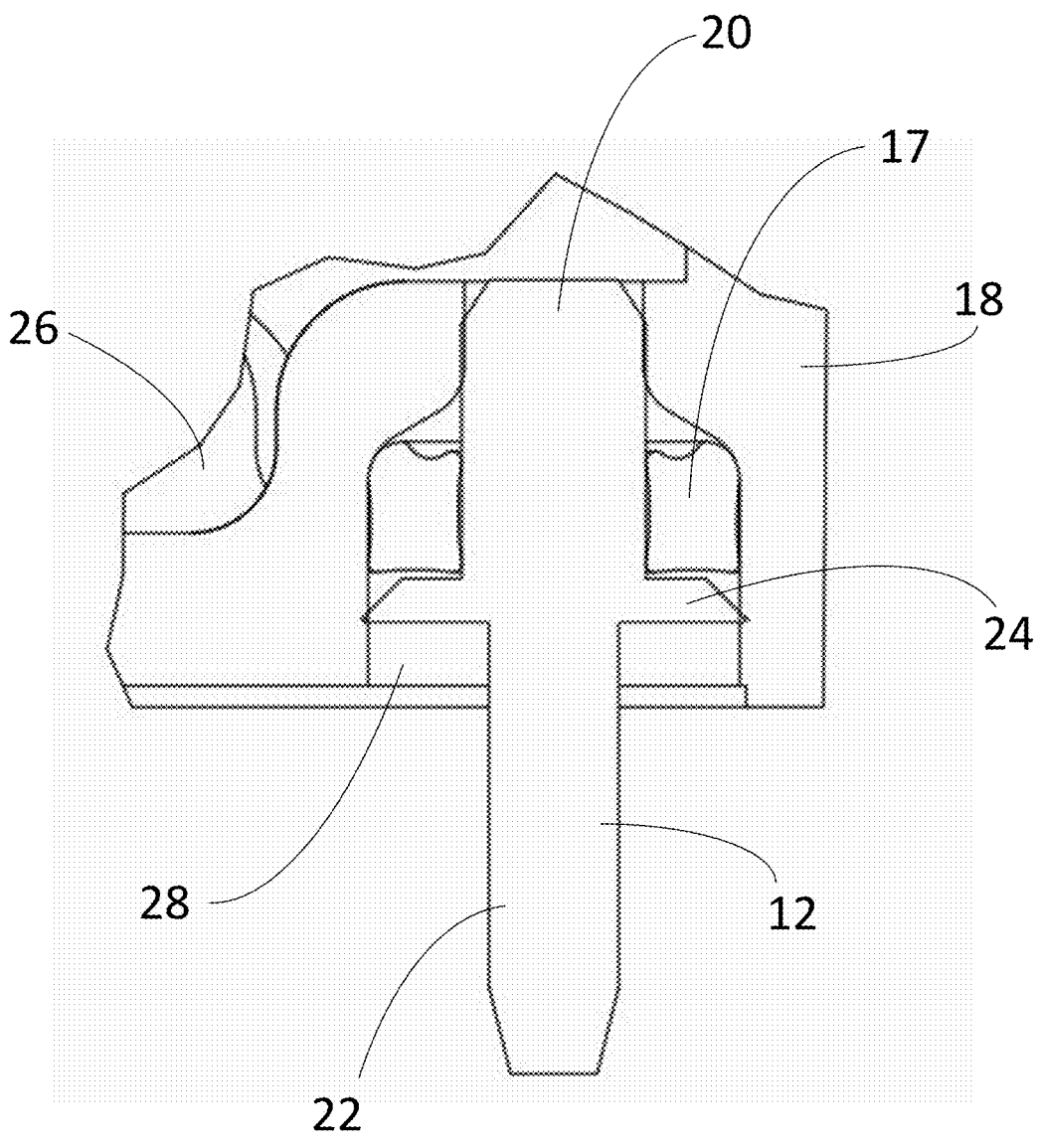
FIG. 4 shows a sealing arrangement of a metal interface pin positioned in the housing of an electrochemical gas sensor in a cut-away representation, wherein the seal comprises an annular seal which in its uncompressed shape has first and second axially spaced lobes and a thinner region therebetween.

FIG. 4 shows a schematic diagram of an embodiment of the present disclosure, wherein an X-ring 17 is used to provide the annular seal in place of the known O-ring. This arrangement with an X-ring has provided unexpected advantages over the previously known system, as will be demonstrated below.

Figure 5:
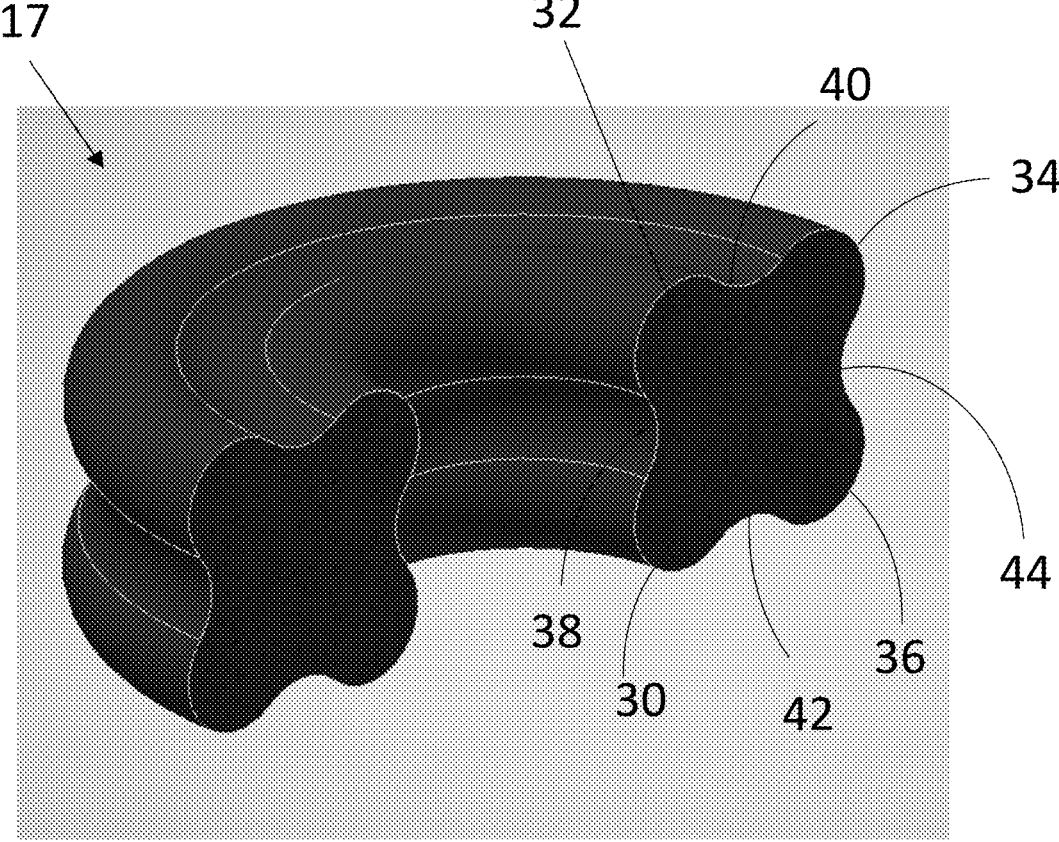
FIG. 5 shows an X-ring seal in partial cross-section.

An X-ring 17 is illustrated in traverse section in FIG. 5. Each of the four lobes 30, 32, 34 and 36 of the X-ring extends around the annual seal in an annular direction. First groove 44 is present between lobes 34 and 36 and opens away from the annular ring radially outward of the annular seal. Second groove 38 is present between lobes 30 and 32 and opens away from the annular ring radially inward of the annular seal. Third and fourth grooves 40, 42, are present between lobes 32 and 34 and between lobes 30 and 36, respectively, and each opens in a direction perpendicular to the plane of the ring, and in a direction opposite to the other. The X-ring seal thereby has four closed loop grooves present in the toroidal direction of the seal: one 38 in the innermost wall of the ring, one 44 in the outermost wall of the ring, and a closed-loop groove 40, 42 on each of the upper and lower sides of the ring. Opposite grooves are aligned with each other.

Figure 6:
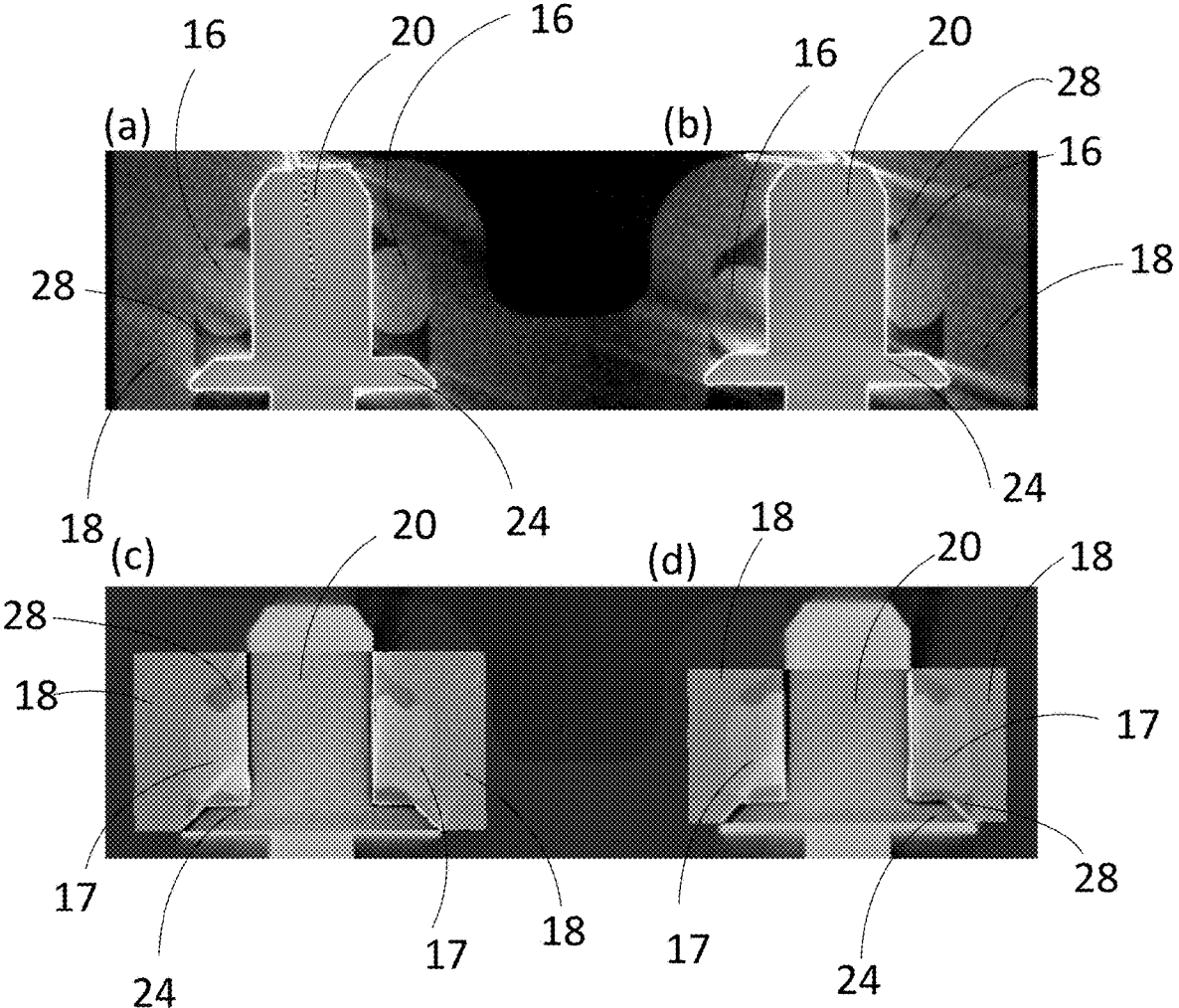
FIG. 6 shows x-ray images of a metal interface pin of an electrochemical sensor. A seal comprising a standard O-ring annular seal is illustrated in (a) and (b), and a seal comprising a standard O-ring annular seal is illustrated in (a) and (b), a seal comprising an annular seal which in its uncompressed shape has first and second axially spaced lobes and a thinner region therebetween is illustrated in (c) and (d).

With this structure, the cross-section of an X-ring presents a generally square shape in comparison with an O-ring. The tendency of the X-ring to present a square cross-section may have the effect that a greater sealing area is created between the interface pin and the indented portion. This is borne out in the x-ray images shown in FIG. 6. FIGS. 6(*a*) and 6(*b*) show x-ray images of a conventional O-ring seal and FIGS. 6(*c*) and 6(*d*) show x-ray images of a seal utilising an X-ring. Several differences between the sensor with the O-ring and the sensor with the X-ring are apparent from these images. Firstly, the X-ring provides a greater seal area. Furthermore, the angle between the outer surface of the annular seal and the corresponding sealing surface, whether that be the surface of the first connection end 20 of the interface pin 12 or the surface of the indented portion 28 of the housing 18, is more acute in the case of an O-ring, than for an X-ring, where the angle tends to a right angle. A further difference is that the X-ring demonstrates less contortional deformation than the O-ring. This may result in a more consistent assembly of the sensor, and consequently more mechanical stability in this aspect of the sensor construction. The requirements for the seal are that it should be liquid tight so as to retain electrolyte within the sensor, but at the same time there should be a level of gas permeability sufficient to avoid dangerous over-pressure building up within the sensor body through the production of gas at the sensor electrodes. The changes to the sealing properties which are a result of using an X-ring serve these requirements.

Without wishing to be bound by theory, it may be that the seal functions as a valve, allowing the controlled egress of gas when a sufficient pressure builds up within the interior of the sensor, while restricting the egress of electrolyte. It may be that in use the sealing line that is in closest communication with the interior of the sensor is penetrated first by gas as pressure within the sensor increases. Then the second sealing line, in closest communication with the exterior, is penetrated by gas, but as gas egresses past the second sealing line, the first sealing line again becomes gas tight. In this way, controlled egress of gas with minimum loss of electrolyte may be enabled.

Figure 7:
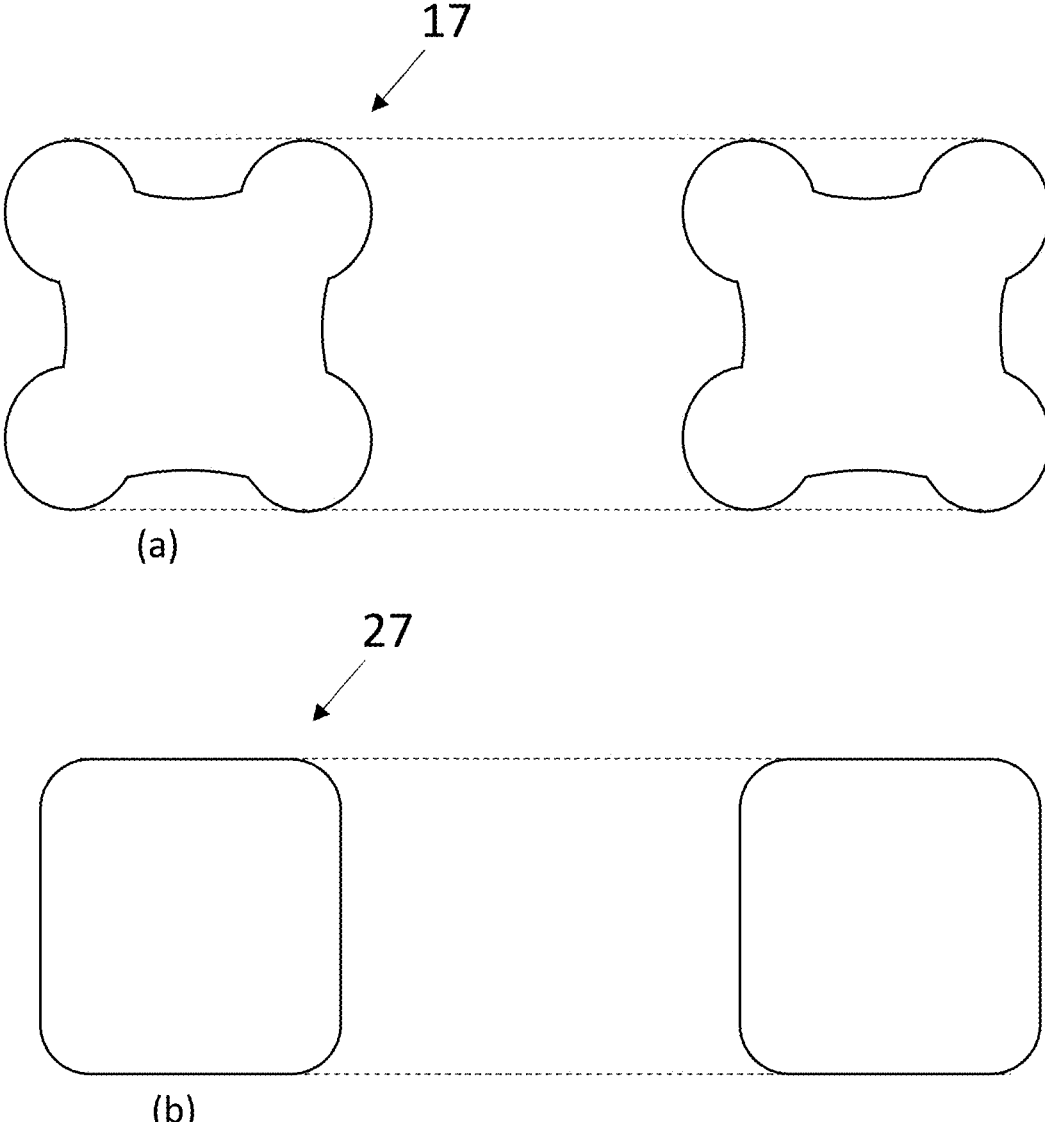
FIG. 7 illustrates (a) an X-ring seal in cross section; and (b) a further embodiment of an annular seal whose width is constant over an extended axial direction.

FIG. 7(a) illustrates an X-ring seal 17 in cross-section. FIG. 7(b) illustrates a further annular seal 27 in cross-section. Each of FIG. 7(a) and FIG. 7(b) illustrates an annual seal in its uncompressed form, i.e. prior to placement in a sensor. In the example of the annular seal illustrated in FIG. 7(b) the four lobes of the X-ring are clearly seen. The example of the annular seal illustrated in FIG. 7(b) presents parallel sides which extend in the axial direction over approximately 90% of the dimension of the annular seal in the axial direction. Improved sensor performance through a reduction in the failure rate has been observed and can be expected through the use of such annular seals in place of the O-ring seal known in the art. The improved reliability is a result of the altered sealing profile provided by these annular seals.

Improved sensor performance is demonstrated in experimental results.

Figure 8:
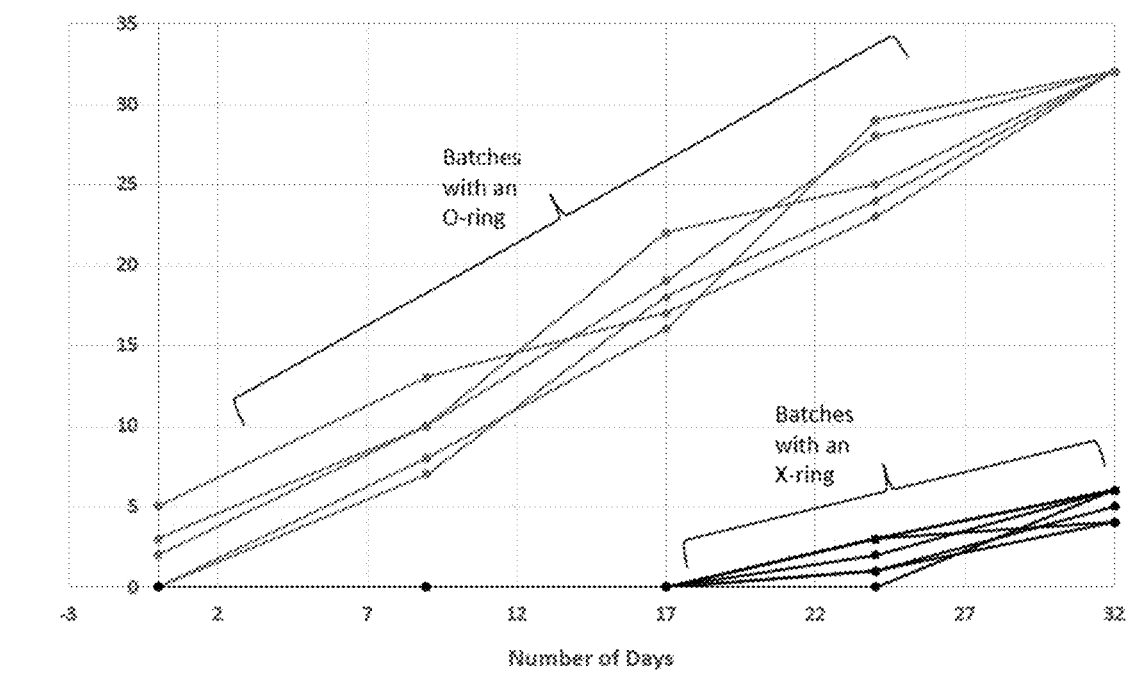
FIG. 8 shows the results of comparative failure tests on several electrochemical sensors comprising either conventional O-ring annular seals or X-ring seals.

FIG. 8 shows the results of a series of failure tests carried out on twelve batches of thirty two galvanic gas sensors, five of which have an O-ring providing the seal at the metal interface pin, and seven of which have an X-ring providing this role. It is apparent from this data that the failure rate of sensors with an X-ring seal is markedly better than that of sensors with an O-ring seal. Sensors with an O-ring seal show a finite failure rate from the outset, whereas sensors with an X-ring only start to demonstrate failure after around 3 weeks.

These results were obtained from sensors are placed at relatively high temperature and humidity in order to provide a highly accelerated life test (HALT). It was found that these were the best conditions to force the electrolyte leakage. And such methodology is widely used within the industry to model sensor lifetime. Sensors were checked regularly using pH paper to test for any trace of electrolyte at the base of the sensor around the pins. At the beginning of the experiment no trace of electrolyte is detected. Week after week more sensors come to leak. It became very clear that the sensors with O-rings leak earlier than the sensor with X-ring. It was also found that the leaks are less abundant for the sensors with X-rings. Extending the experiment to a total of 6 months showed that the sensors with an X-ring will still allow for leakage but later. The risk could be that pressure not allowed to dissipate could compromise the integrity of the sensors. We verified, here, that all the X-ring sensors were functional after the 6-month test.

The experimental results demonstrate the improved performance, in the form of a significantly reduced failure rate, that is achieved when an X-ring seal is used instead of an O-ring seal to seal the port in the housing of an electrochemical sensor which gives access to a metal interface pin enabling electrical access to the sensor electrodes from outside the sensor.

Further increased performance can be achieved through careful choice of the material from which the X-ring seal is manufactured. Failure rates over time have also been measured for (a) a sensor utilising an X-ring made from EPDM synthetic rubber and (b) a sensor utilising an X-ring made from nitrile. It is apparent from this data that an electrochemical sensor which utilises an X-ring seal made from nitrile is significantly less susceptible to failure than a sensor with an X-ring made from EPDM synthetic rubber.

The invention claimed is:

1. An electrochemical gas sensor comprising a housing, the housing containing a plurality of electrodes and a liquid electrolyte, the housing having a gas inlet for receiving analyte gas, the sensor defining at least one port through the housing having a metal interface pin therein, the interface pin extending through the port from the exterior of the housing, being electrically connected to at least one of the plurality of electrodes in the interior of the housing, the sensor additionally comprising a seal located around the metal interface pin within the port, and compressed between a wall of the port and the metal interface pin thereby restricting egress of liquid electrolyte from the housing, wherein the seal comprises an annular seal which in its uncompressed form either presents a cross-section which is concave in a radially extending direction of the seal, or whose width is constant over an extended axial direction of the seal, wherein the seal functions as a valve, allowing the controlled egress of fluid/liquid when there is a sufficient pressure build up within the sensor.

2. An electrochemical gas sensor according to claim 1, wherein the annular seal in its uncompressed form presents a radially outwardly open groove and a radially inwardly open groove.

3. An electrochemical gas sensor according to claim 2, wherein in the uncompressed annular seal the radially outwardly open groove and the radially inwardly open groove are directly opposite one another such that the radially outwardly open groove and the radially inwardly open groove define, in-between the two grooves, a neck region of the annular seal.

4. An electrochemical sensor according to claim 2, whereby the annular seal comprises a parting line within a said groove.

5. An electrochemical sensor according to claim 2, wherein the annular seal comprises further open grooves and each of the further open grooves is outwardly open in an axial direction of the annular seal, whereby each of the open grooves is a closed-loop groove.

6. An electrochemical sensor according to claim 2, wherein the annular seal further comprises closed-loop grooves, wherein for each of the closed-loop grooves of the annular seal, the annular seal has another closed loop groove directly opposite.

7. An electrochemical sensor according to claim 1, whereby the annular seal is an X-ring.

8. An electrochemical sensor according to claim 1, whereby the annular seal in the sensor has a closed loop of first compression, bordered by two closed loops of second compression, whereby the first compression is less than the first compression.

9. An electrochemical gas sensor according to claim 1, wherein the cross-section of the annular seal in its uncompressed form presents parallel sides which extend in the axial direction.

10. An electrochemical gas sensor according to claim 9, wherein the cross-section of the annular seal in its uncompressed form presents parallel sides which extend in the axial direction over at least 25% of the dimension of the annular seal in the axial direction.

11. An electrochemical gas sensor according to claim 10, wherein the cross-section of the annular seal in its uncompressed form presents parallel sides which extend in the axial direction over at least 50% of the dimension of the annular seal in the axial direction.

12. An electrochemical gas sensor according to claim 1, wherein the sensor is a galvanic oxygen sensor.

13. An electrochemical sensor according to claim 1, whereby the annular seal in its uncompressed form is uniform in its material composition.

14. An electrochemical sensor according to claim 1, whereby the annular seal in its uncompressed form possesses a uniform compressibility.

15. An electrochemical sensor according to claim 1, comprising a sensing gas space in gaseous communication with the gas inlet and a sensing electrode for the introduction of gas to the sensing electrode; and a reservoir gas space, separate to the sensing gas space, in contact with a reservoir and in gaseous communication with the port.

16. An electrochemical sensor according to claim 1, wherein the metal interface pin comprises a first connection end and a second connection end, between which first and second connection ends is a circumferential ridge.

17. A method of assembling an electrochemical gas sensor according to claim 1, the method comprising inserting the annular seal into an indented region of the housing wall leading to the port through the sensor housing, and inserting a first connection end of the metal interface pin through the annular seal, the annular seal being thereby radially compressed between the indented region of the housing wall and the first connection end of the interface pin to seal the port from the external atmosphere, wherein the annular seal in its uncompressed form presents a radially outwardly open groove and a radially inwardly open groove.

18. A method according to claim 17, whereby the annular seal is manufactured through a moulding procedure.

19. A method according to claim 17, wherein the annular seal is inserted into the indented region of the housing wall in such a way to avoid rolling and to avoid the creation of torsion within the annual seal.

20. An electrochemical gas sensor according to claim 1, wherein the sensor is a sensor for ammonia, carbon dioxide, carbon monoxide, hydrogen sulphide, chlorine, ethylene oxide, hydrogen, hydrogen chloride, nitric oxide, nitrogen dioxide, NOx, combustible gases, or volatile organic compounds (VOCs).

\* \* \* \* \*